US011725958B2

(12) United States Patent
Hendrix et al.

(10) Patent No.: US 11,725,958 B2
(45) Date of Patent: Aug. 15, 2023

(54) ROUTE GUIDANCE AND PROXIMITY AWARENESS SYSTEM (71) Applicants: Jennifer Hendrix, Waxahachie, TX (US); Tyler William Harrist, Fort Worth, TX (US); Kevin Tung, Mansfield, TX (US); Christopher Thomas Conly, Arlington, TX (US)

(72) Inventors: Jennifer Hendrix, Waxahachie, TX (US); Tyler William Harrist, Fort Worth, TX (US); Kevin Tung, Mansfield, TX (US); Christopher Thomas Conly, Arlington, TX (US)

( * ) Notice: Subject to any disclaimer, the term of this patent is extended or adjusted under 35 U.S.C. 154(b) by 0 days.

(21) Appl. No.: 16/911,021

(22) Filed: Jun. 24, 2020

(65) Prior Publication Data
US 2020/0326199 A1 Oct. 15, 2020

Related U.S. Application Data (63) Continuation-in-part of application No. 16/361,870, filed on Mar. 22, 2019, now Pat. No. 11,266,530.
(Continued)

(51) Int. Cl.
G01C 21/36 (2006.01)
G06T 7/73 (2017.01)
(Continued)

(52) U.S. Cl.
CPC ..... *G01C 21/3629* (2013.01); *G01C 21/3691* (2013.01); *G01S 19/42* (2013.01);
(Continued)

(58) Field of Classification Search
CPC ................ G01C 21/3691; G01C 21/20; G01C 21/1656; G06T 7/73; G01S 19/42;
(Continued)

(56) References Cited

U.S. PATENT DOCUMENTS

2005/0189503 A1  9/2005  Jamieson et al.
2015/0324545 A1  11/2015  Kimia
(Continued)

OTHER PUBLICATIONS

Klaus (Computers Helping People with Special Needs—15th International Conference, ICCHP 2016—DOI 10.1007/978-3-319-41267-2—Linz, Austria, Jul. 13-15, 2016) (Year: 2016).*
(Continued)

*Primary Examiner* — Nasim N Nirjhar
(74) *Attorney, Agent, or Firm* — Law Office of Jeff Williams PLLC; J. Oliver Williams (57) ABSTRACT A route guidance and proximity awareness system for the visually impaired includes a main body assembly worn around the body of the user and a headset assembly worn around the head of the user. The system incorporates proximity awareness technology and navigation technology to generate a 3D audio output to a user so as to generate an audible virtual environment reflective of the physical environment of the user. The assemblies include line of sight sensors, a central processing unit, a navigation module, and a camera assembly. Obstacles are detected and classified with a location and distance, and are concurrently processed with real time navigation that is adjusted to instruct not only how to get to a location but also how to avoid obstacles.

20 Claims, 4 Drawing Sheets

Related U.S. Application Data (60) Provisional application No. 62/646,708, filed on Mar. 22, 2018.

(51) Int. Cl.
  *H04R 5/033* (2006.01)
  *H04S 7/00* (2006.01)
  *G01S 19/42* (2010.01)
  *H04R 5/04* (2006.01)

(52) U.S. Cl.
  CPC ............... *G06T 7/73* (2017.01); *H04R 5/033* (2013.01); *H04R 5/04* (2013.01); *H04S 7/304* (2013.01); *H04S 2400/11* (2013.01)

(58) Field of Classification Search
  CPC ........... H04R 5/033; H04R 5/04; H04S 7/304; H04S 2400/11
  See application file for complete search history.

(56) References Cited

U.S. PATENT DOCUMENTS

| | | |
|---|---|---|
| 2018/0181201 A1 | 6/2018 | Grant et al. |
| 2018/0189567 A1 | 7/2018 | Maheriya et al. |
| 2019/0052838 A1* | 2/2019 | Ashkenazi ............ H04W 4/185 |

OTHER PUBLICATIONS

Daniela (Stereosonic vision: Exploring visual-to auditory sensory substitution mappings in an immersive virtual reality navigation paradigm—Published: Jul. 5, 2018—https://doi.org/10.1371/journal.pone.0199389) (Year: 2018).*

Office Action in related U.S. Appl. No. 16/361,870, dated Mar. 6, 2020, 24 pages.

Office Action in related CA application No. 3037657, dated Apr. 14, 2020, 5 pages.

* cited by examiner

ROUTE GUIDANCE AND PROXIMITY AWARENESS SYSTEM

This application claims the benefit of and is a continuation in part of U.S. Nonprovisional patent application Ser. No. 16/361,870, filed 22 Mar. 2019, which claims benefit to U.S. Provisional Application No. 62/646,708, filed 22 Mar. 2018. The information contained therein is hereby incorporated by reference.

BACKGROUND

1. Field of the Invention

The present application relates generally to an electronic navigation and proximity awareness system, and in particular to a system designed to provide route guidance and proximity awareness feedback audibly to assist visually impaired users navigate without incident.

2. Description of Related Art

The CDC reports that there are more than 285 million people who are blind or visually impaired. More than 7 million people go blind each year in the United States. The World Health Organization (WHO) states that every 5 seconds a person in the world goes blind. Every 1 minute, one of those people is a child. The loss of one's ability to move through the world has the greatest negative impact on human development. Blindness can arise from one of many different causes, such as macular degeneration, accident or injury, diabetes, and so on. Blindness works to severely limit one's ability to be mobile. This lack of mobility inherently results often in the seclusion, depression, and inability of those individuals from engaging in the public environment.

Various methods or devices have been developed to assist blind individuals in navigating and engaging in the public environment. For example, seeing-eye dogs are used to help direct an individual. Although dogs help in terms of general navigation, the dog is unable to provide accurate and detailed navigation to the blind. Additional disadvantages to the use of trained dogs to solve navigation issues is that the training of dogs can be very time consuming and costly. Additionally, distractions may arise which may get in the way of the dog performing despite training.

Another method or device is the elongated stick. The blind individual is tasked with repetitively passing the stick in a sideways motion in front of them to alert them to any obstacles. This stick only provides immediate obstacle detection but provides no additional benefit.

Although great strides have been made in the area of mobility aids for the visually impaired, considerable shortcomings remain in helping them freely navigate through society. Most navigation systems today are designed to provide route guidance with little regard to potential obstacles. Obstacles may be dynamic or static in nature. For example, a map program may provide turn by turn instructions at selected points of interest but does not typically care what happens between such points. These systems deal with a relatively unchanging map to provide routes. Some steps have been taken to design a system that accounts for changes and obstacles on the road. These are incorporated into vehicles to allow the vehicle to adjust speed or stop as obstacles arise. Taken to another level, self-driving cars are contemplated that will autonomously navigate the route on behalf of the user. However, there are large limitations on being able to process and account for obstacles that are dynamic in nature. These cars have an assortment of difficulties in traversing traffic.

On a large scale and in limited situations, these systems may be sufficient. However, traveling or navigating is not always done on standard routes via streets, or outside exposed to the elements. A large amount of our traveling is done inside buildings, amongst ever changing environments from moving people, objects, and hazards.

More current attempts to make a system facilitate personal route navigation is by using object detection/recognition technology that works through a camera to analyze the environment and categorize objects based on size and physical features. Objects, such as doors, chairs, and tables can be identified. By using multiple cameras, a depth can be associated with such object. The depth and identification may be over-laid or indexed to provide feedback to the user about what objects are recognized. This feedback is usually in the form of an audible voice calling out the name of the object. A major drawback to these systems is that they still do not provide truly usable data to the user to navigate. It may identify objects, true. But in dynamic environments (i.e. walking down the street) it is impossible to verbally identify each object by name and communicate that to the user prior to the environment already changing.

Additionally, these systems are typically mounted to the head of the user. The head mounts have one or more cameras to obtain the line of sight of the user and simultaneously capture the distance. These head mounts are heavy. Furthermore, the head movements made detection and processing very difficult as too much movement increases the processing necessary and latency issues.

A more portable and adaptable system is needed that will adapt to non-mainstream or high-level routes, provide object detection, and communicate commands to the user in a manner that builds a three-dimensional audio space to allow the user to avoid the objects while maintaining the best route to the overall destination. A system such as this is needed especially for visually impaired users to navigate freely in society.

SUMMARY OF THE INVENTION

It is an object of the present application to provide a route guidance and proximity awareness system that grants the visually impaired an ability to interact and function within society in a manner that promotes free movement through public spaces. The system uses an immersive audio environment to communicate information regarding the user's immediate physical environment, such as objects, obstacles, physical pathways, and other features). It also communicates mid-range physical environment (i.e. distant objects depicting environmental scale, landmarks, etc.), and extended range navigational environment (i.e. progression along a large scale navigational path, cardinal orientation, location of origin, and location of destination).

The system is designed to be wearable, hands-free and inconspicuously used all while providing an awareness and understanding of immediate and extended physical environments.

The system is worn inconspicuously by the user in a manner that creates minimal physical interface between the system and the user. It is an object of the present application to provide a system that includes a number of wearable electrical components that minimize bulk and avoid limitation to user movements. The system is configured to include a main body assembly to be worn by the user. The main body assembly uses a plurality of electrical components to track and monitor static and dynamic moving objects and process such information for transmission to the user. The system will monitor location of the user using global positioning system (GPS) or navigational technology. Directions may be provided through waypoints, points of interest, or other map generated locations that are identifiable to the user in the audible space. The positioning and navigating may be done via the main body assembly or through another portion of the system for relay to the user. A headset assembly will also be worn by the user and include a plurality of electrical components to receive communication from the main body assembly in the way of binaural audio.

The system captures real-time information about the user's immediate surroundings and position within a navigational frame and presents the information to the user in the form of an immersive Audio-Augmented Reality (AAR) environment through a set of earphones in the headset assembly. Within the AAR environment, obstacles, pathways, and navigational instructions (i.e. "audio flags", "audio pathway beacons", and "audio navigational beacons" for example) are each presented to the user as a sound which appears to be emanating from an exact location in 3-D space (azimuth, elevation, and distance) with respect to the users' real-time line of sight. Essentially, the system gives sound to otherwise quiet things.

The system further addresses the interaction of three areas, namely the user experience, proximity awareness, and navigation. The system will sense and compute both dynamic and static obstacles as well as locate the user and calculate navigational information. The information and data are synthesized into a 3D audio output for receipt of the user. This is manifest through immersive spatial audio that transforms the physical world into an audibly defined three-dimensional space. The system updates and monitors in real-time and continuously adapts to the movements and interests of the user.

The system will also be equipped with a plurality of sensors that are configured to independently track the line of sight of the camera and the line of sight of the user's head therefore eliminating the need to physically couple the two sensors. Such sensors may be located in the main body assembly for determining the orientation or direction of the user; as well as located in the headset assembly to determine the line of sight of the face of the user. Each will be taken in relation to a coordinate system and later indexed or layered to a combined coordinate system.

A further object of the present application is to permit a user the ability to adjust the scanning radius for obstacle avoidance.

Another object is to permit the user the ability to apply tags or beacons which are sounds applied to navigational waypoints or destinations, or other people and users. Sound markers may also be designated by the user and applied to objects or obstacles. These markers, beacons and tags are useful to a user to distinguish and decipher the environment around him/her.

In one embodiment of the present application the system includes a manual user interface to permit the user the ability to adjust audio markers for particular objects and/or places. This is performed through the use of line of sight technology in combination with the direction of viewing of the user.

It is a further object of the present application that features such as line of sight focus adjustment, route backtracking, route memorization/optimization be available. Ultimately the invention may take many embodiments. In these ways, the present invention overcomes the disadvantages inherent in the prior art.

The more important features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one embodiment of the present invention in detail, it is to be understood that the embodiments are not limited in its application to the details of construction and the arrangements of the components set forth in the following description or illustrated in the drawings. The embodiments are capable of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present design. It is important, therefore, that the claims be regarded as including such equivalent constructions insofar as they do not depart from the spirit and scope of the present application.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

While the embodiments and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the embodiments described herein may be oriented in any desired direction.

The embodiments and method in accordance with the present application overcomes one or more of the above-discussed problems commonly associated with the prior art. In particular, the route guidance and proximity awareness system of the present application integrates a plurality of different technologies together to provide an audibly immersive environment representative of the actual environment in which the visually impaired are situated within. The system immerses its user in an auditory augmented reality environment which communicates information regarding objects, obstacles, and pathways in the user's immediate physical proximity; and information regarding the user's progression and bearing within a navigational map. The system includes a wearable device which garners information about the user's immediate and extended physical environments, orientation, and progression along a navigational path and presents pertinent information to the user in the form of an immersive audio spatial environment.

The system is further designed to capture static environmental characteristics and combine that with active detection of both static and dynamic features. These are processed through an algorithm to generate communication information provided to the user as to how best to navigate the environment. The system is configured to provide navigational instruction audibly which may include turn by turn instruction as well as course adjustments to the individual along the route. These and other unique features are discussed below and illustrated in the accompanying drawings.

The embodiments and method will be understood, both as to its structure and operation, from the accompanying drawings, taken in conjunction with the accompanying description. Several embodiments of the assembly may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

Referring now to the Figures wherein like reference characters identify corresponding or similar elements in form and function throughout the several views. The following Figures describe embodiments of the present application and its associated features. With reference now to the Figures, embodiments of the present application are herein described. It should be noted that the articles "a", "an", and "the", as used in this specification, include plural referents unless the content clearly dictates otherwise.

Figure 1:
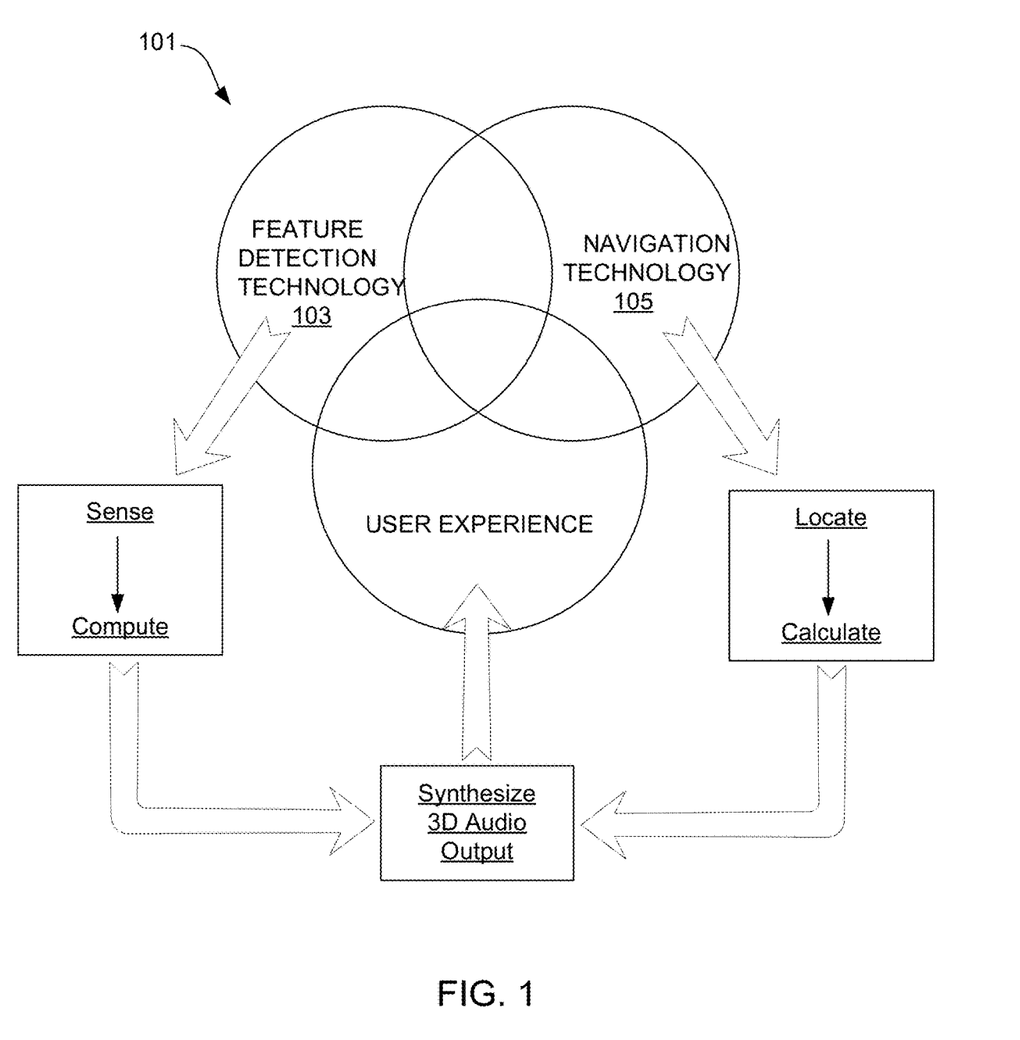
FIG. 1 is a chart of an operative overview of a route guidance and proximity awareness system according to an embodiment of the present application.

Referring now to FIG. 1 in the drawings, a chart showing the operative overview of the route guidance and feature detection system 101 in accordance with the present application is illustrated. System 101 uses assorted technologies (103, 105) in combination with the one or more sensors/modules to generate an immersive 3D audio output that is provided to the user as a means of recreating or representing their environment in an audible form.

System 101 garners, calculates, or otherwise collects information regarding the user's immediate and extended environment and presents the environment to the user in the form of an immersive audible-augmented reality (AAR) environment. The AAR environment is an environment in which features that exist in 3-Dimensional space are assigned representative sounds, and those sounds are spatialized in a coordinate system that is based on the location user and the orientation of the user's head and/or user's line of sight.

Feature detection technologies 103 are configured to sense and compute the location of obstacles or physical features proximate and/or distant to the user. The objects or features may be static or dynamic in movement. A plurality of objects/features may be tracked simultaneously. The act of sensing obstacles is done through one or more wearable sensors. A camera may be used to capture visual data around the environment to assist in detection and classification of the physical environment features (i.e. recognition technology).

Aspects of the environment that may be presented include Proximal Semantic Objects which are objects in the environment that can be recognized by common methods of computer vision and are within range of a depth sensor. Additionally, Distant Semantic Objects may be presented. These are objects in the environment that can be recognized by common methods of computer vision and are not within range of a depth sensor (in range of 2D camera only). Proximal Non-Semantic Objects are objects that can NOT be easily recognized by common methods of computer vision but ARE within range of a depth sensor (i.e. rock, wall, other feature without unique shape). Digitally Mapped Objects may also be presented and these are objects or features which exist as data on a digital map. This can include permanent features such as landmarks, intersections, reference directions etc., or even situational features such as origin points, waypoints, and destinations Navigation technologies 105 is configured to locate and calculate the location of the user and transmit such data to the one or more processors for synthesizing. Technologies 105 may locate through the use of GPS technology. It may also provide the user with landmark information to provide a fuller view of the environment. Warnings that are detected through technology 103 may be synthesized with technology 105 to provide real time warnings that emerge within the environment. Additionally, technology 105 can memorize and store particular routes (i.e. commonly traveled or of interest to the user) for use at later times. Likewise, routes may be backtracked automatically through technology 105 and provided to the user as needed. For example, if a detour was found along a route but not noted through GPS (i.e. sidewalk closed) the user could backtrack along the same route automatically for a short distance to get to another permitted route.

The information through technologies 103 and 105 are synced and processed through a central processing unit and synthesized to generate the immersive 3D audio output for the user as presented as the immersive AAR (Audio-Augmented Reality) environment. The AAR environment may be generated in real time to provide a continuously updated audible environment to the user. The AAR environment is the 3D audio output which may include detected obstructions along a route, as well as proximity awareness to features. Obstacle/landmark identification is included to permit the user a full audible view of what is in the environment. The 3D audio relates to an audible sound that appears to come to the user from a specific distance and direction. The distance and direction are reflected in different ways. For example, the decibel level of the sound can indicate an amount of distance. The sound can then be provided to the user through headphones to provide directional hearing so as to locate the sound relative to the user. This output enhances the user experience and facilitates freedom to move.

System 101 goes beyond audible turn-by-turn instructions or verbal cues. The AAR environment allows the user to freely navigate public spaces without turn-by-turn instructions. Way points may be presented as sound beacons in the AAR environment to facilitate navigation without the need for the system to provide audible instruction. Objects, destinations, and features are selectively classified and assigned an audible sound. This sound data is translated into the immersive 3D audible environment and communicated to the user having location and depth.

Technologies 105 can receive route or map information based on any number of sources, such as GPS for outdoor uses predominantly. Another example is layout data for buildings for indoor use. These may be provided via a terminal at an entrance of the building and automatically synced with system 101 upon entry for example. The system 101 is configured to alternate between indoor and outdoor navigation seamlessly, or in other words between exterior and interior maps. Location may be done for indoor and outdoor locations and calculations of routes are based upon waypoints, landmarks, warnings, and obstacles noted above.

It is understood that system 101 relies upon the creation of an audible environment to represent the actual physical environment of the user. Various sounds may be generated and produced through a central processing unit. Audio markers are applied to features/obstacles. Audio beacons may apply to navigational waypoints or destinations. Audio tags relate to sound applied to other people/users.

Figure 2:
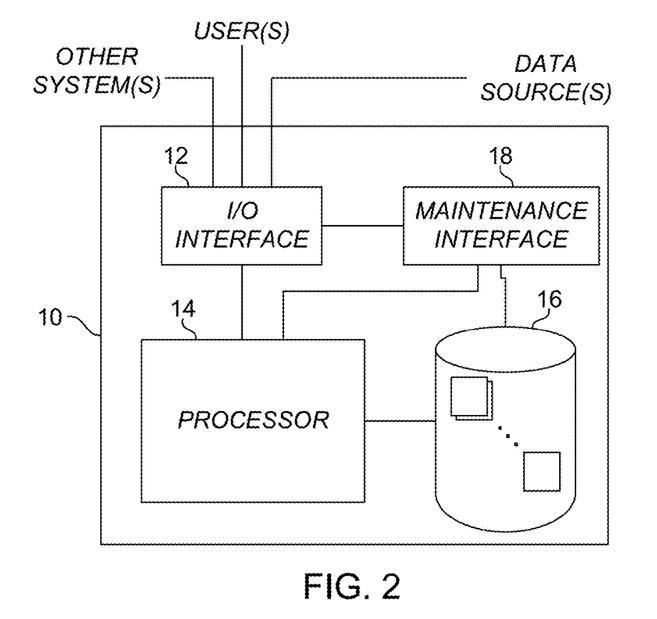
FIG. 2 is an exemplary schematic of a computing system used in the route guidance and proximity awareness system of FIG. 1.

Referring now also to FIG. 2 in the drawings, a schematic of an exemplary electronic computing system for use within system 101 is illustrated. As stated previously, the functions and features of system 101 are such that one or more electronic devices, sensors, modules, and systems operate in a cooperative manner to produce the immersive 3D audio output. Any of these may be termed an electronic computing system and may be involved in the processing, capture, and/or transmission of data. FIG. 2 illustrates an exemplary set of components used to facilitate the features and functions of the devices, sensors, modules, and in general various systems used to function together in system 101. The computing system 10 may be a representative example of any individual device, sensor, module, or system individually or any collective combination of such.

The computing system 10 includes an input/output (I/O) interface 12, a processor 14, a database 16, and a maintenance interface 18. Alternative embodiments can combine or distribute the input/output (I/O) interface 12, processor 14, database 16, and maintenance interface 18 as desired. Embodiments of the computing system 10 can include one or more computers that include one or more processors and memories configured for performing tasks described herein below. This can include, for example, an electronic computing device (i.e. computer) having a central processing unit (CPU) and non-volatile memory that stores software instructions for instructing the CPU to perform at least some of the tasks described herein. This can also include, for example, two or more computers that are in communication via a computer network, where one or more of the computers includes a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations and cell phones, that are suitable for also performing other tasks. Furthermore, the computers may use transitory and non-transitory forms of computer-readable media. Non-transitory computer-readable media is to be interpreted to comprise all computer-readable media, with the sole exception of being a transitory, propagating signal.

The I/O interface 12 provides a communication link between external users, systems, and data sources and components of the computing system 10. The I/O interface 12 can be configured for allowing one or more users to input information to the computing system 10 via any known input device. Examples can include a keyboard, mouse, touch screen, microphone, and/or any other desired input device. The I/O interface 12 can be configured for allowing one or more users to receive information output from the computing system 10 via any known output device. Examples can include a display monitor, a printer, a speaker, and/or any other desired output device. The I/O interface 12 can be configured for allowing other systems to communicate with the computing system 10. For example, the I/O interface 12 can allow one or more remote computer(s) to access information, input information, and/or remotely instruct the computing system 10 to perform one or more of the tasks described herein. The I/O interface 12 can be configured for allowing communication with one or more remote data sources. For example, the I/O interface 12 can allow one or more remote data source(s) to access information, input information, and/or remotely instruct the computing system 10 to perform one or more of the tasks described herein.

The database 16 provides persistent data storage for computing system 10. While the term "database" is primarily used, a memory or other suitable data storage arrangement may provide the functionality of the database 16. In alternative embodiments, the database 16 can be integral to or separate from the computing system 10 and can operate on one or more computers. The database 16 preferably provides non-volatile data storage for any information suitable to support the operation of the computing system 10, including various types of data discussed below.

The maintenance interface 18 is configured to allow users to maintain desired operation of the computing system 10. In some embodiments, the maintenance interface 18 can be configured to allow for reviewing and/or revising the data stored in the database 16 and/or performing any suitable administrative tasks commonly associated with database management. This can include, for example, updating database management software, revising security settings, linking multiple devices, and/or performing data backup operations. In some embodiments, the maintenance interface 18 can be configured to allow for maintenance of the processor 14 and/or the I/O interface 12. This can include, for example, software updates and/or administrative tasks such as security management and/or adjustment of certain tolerance settings.

The processor 14 is configured receive communication data from one or more sources, such as technologies 103 and 105, and process that data according to one or more user parameters. Examples of parameters could be limitations, warnings, time related functions, spatial restrictions such as location limitations, and so forth. The processor 14 can include various combinations of one or more computing systems, memories, and software components to accomplish these tasks and functions. The communication data from technologies 103 and 105 are synthesized and processed to generate the 3D audio output for the user to listen to. Processor(s) 14 may exist as part of any component or subsystem individually or collectively.

Figure 3:
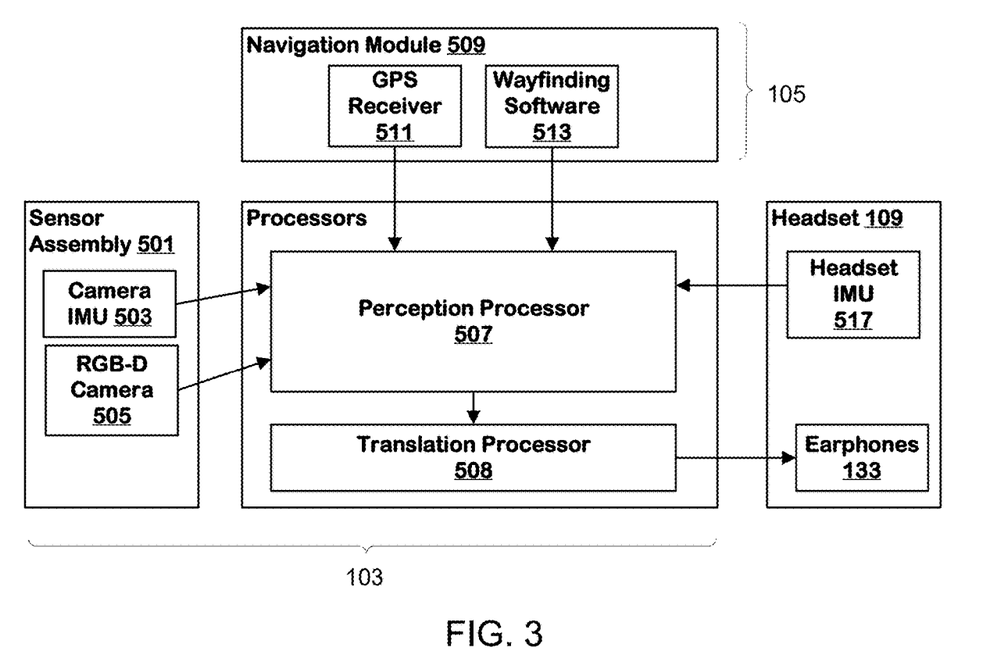
FIG. 3 is an exemplary schematic of the route guidance and proximity awareness system of FIG. 1.

Referring now also to FIG. 3 in the drawings, an exemplary schematic of a system 101 is illustrated. The schematic of FIG. 3 is a high level overview of one type of representation. More details are provided into technologies 103 and 105. It is understood that the processors may be shared between technologies 103 and 105. System 101 includes a sensor assembly 501 that incorporates one or more devices to assist in the feature detection functions of system 101 through technology 103. Examples of such devices may be sensor assembly 501 and navigation module 509. A headset 109 is also included for the broadcasting of sound to the user.

Assembly 501 may include a Camera IMU (Inertial Measurement Unit) 503 and a RGB-D (Red, Green, Blue, Depth) Camera 505. Other such devices are possible and system 101 is not limited to only these types. Sensor assembly 501 is configured to capture RGB-D video of the environment of the user. Sensor Assembly 501 is mounted to stable portion of the user (i.e. minimal jarring and movement when the user moves such as the torso). The RGB and Depth data is provided to the perception processor 507. Camera IMU 503 is configured to provide raw movement and orientation data of camera 505 to perception processor 507. Camera IMU 503 data is provided to the perception processor 507. All data related to the features captured through assembly 501 may be termed in whole or in part as feature data.

A navigation module 509 is included within system 101 and is used to carry out the functions of technologies 105. Module 509 may include a GPS receiver 511 and a wayfinding software 513. Other devices and systems are possible and system 101 is not limited herein to only such devices. Receiver 511 is configured to measure the user's GPS location and provide a localized coordinate data representative of such location to processor 507. Software 513 provides navigation solutions such as origin points through waypoints to a particular destination. GPS coordinates are assigned for each waypoint and endpoint in a particular navigational solution. A user may request for navigation at their discretion through one or more interfaces. All data related to receiver 511 and software 513 may be termed in whole or in part as navigation data.

The processors, one or more, are used to process and compile the data from assembly 501 and module 509. As noted previously, both semantic and non-semantic features are detected and classified. With respect to the semantic features (layer), processor 507 may use common object recognition techniques to recognize and classify the semantic objects within the field of view (FOV) of camera 505. The azimuth and elevation coordinates of recognized objects are measured WRT (with respect to) that FOV. Also, the depth/distance coordinate of recognized features are measured by indexing the RGB FOV of camera 505 with the depth FOV of camera 505.

However, it is desired that these coordinates or coordinate data are represented in a more common or general coordinate space for the user. Processor 507 uses data from Camera IMU 505 to convert the captured coordinates of all recognized features from the camera coordinate space (expressed relative to each camera's LOS/FOV and the distance from each camera) to a Common coordinate space. The common coordinate space is expressed relative to magnetic North, the direction of gravity, and the distance the feature is from the user. Therefore, a change of coordinates is accomplished to the common coordinate space through processor 507.

Furthermore, processor 507 is configured to track feature movements through one or more common tracking techniques. Recognized semantic features are tracked as they move frame to frame, in and out of the FOV of assembly 501 and in and out of temporary periods of loss of data from camera 505 in assembly 501.

Headset 109 is configured to provide the final audio output of the immersive AAR to the user. Data is received through the processors. A headset IMU 517 is included and is configured to capture and monitor the movement of the user's head. IMU 517 provides the raw movement and orientation data of the user's head to processor 507. Earphones 519 receive data from the processors and are then used to provide the final audio output.

Processor 507 uses the data from IMU 517 to convert the coordinates of all recognized features from the common space to the user's head space as expressed relative to the user's head's LOS and distance from the user. A status of the feature is also assigned. The status could related to movement, location, classification, and any other traits or characteristics of the feature. Processor 507 communicates the classification, status, and location of each feature to translation processor 508.

Regarding Non-semantic features, which are objects that cannot be easily recognized by common methods of computer vision but are within range of a depth sensor, processor 507 uses techniques to determine location and general classification. Examples of non-semantic features provided previously were a rock, a wall, or other feature without unique shape. One method of techniques may be to determine a floor plane, wall planes, and ceiling plane using depth camera data and extract a grid of points in the volume/area. These points will be classified in relation to its position. For example, a number of points may be extracted within that area and classified as coinciding with the planes of the volume/area. It may be determined which fall outside of a defined range of distance and be classified as such (out of range). It may be determined whether any of the extracted points fall on a previously detected semantic object and classify them in accordance with the semantic features. Likewise, it may be determined which of the extracted points did not meet any of the above criteria, wherein such may be classified as miscellaneous points. Of all of these extracted points, processor 507 is configured to determine which fall within a defined angle of the user's LOS. Those that are in the LOS of the user's head are identified and transmitted to processor 508 along with the 3D location, with respect to the user's head space, and their classification (similar to that of semantic features). It is understood that the process or method of handling non-semantic features is exemplary in nature and that different criteria and methods may be used in other embodiments.

Processor 507 also receives data from module 509 so as to allow a mix of both object/feature detection to be blended with navigational information. Waypoint coordinates are passed from software 513 to processor 507. The user's localization data is received from receiver 511. Processor 507 then uses the GPS location of the user, the GPS location of waypoints, and the data from IMU 517 to convert all navigational points so as to be expressed in terms of the user's head space (coordinates). Now being in the user's head space coordinates, this navigational data is passed to processor 508 with various other characteristics (i.e. classifications, playback mode, and more).

As seen from the above discussion, a key feature of the present system 101 is the consolidation and reassignment from one coordinate system to another. System 101 is designed to replicate to the user the physical environment of the user as an immersive AAR. The various different devices/sensors/modules and so forth may have different coordinate systems. These are selectively converted and consolidated from the coordinate system (space) it is captured in to eventually reach the coordinate system as defined by the user's line of sight (head space). The immersive AAR is presented to the user as it relates to the user's LOS. In short, processor 507 receives inputs from camera IMU 503, Headset IMU 517, camera 505, navigation data in the form of waypoints from software 513, and the user location in the form of GPS coordinates from receiver 511. This is processed with respect to the head space (coordinates related to the LOS of the user), along with the classification of the feature, status as semantic or non-semantic, waypoints and so forth by processors 507. This data, processed or not processed, received by processor 507 is transmitted to processor 508

Translation processor 508 receives the data above from processor 507 and assigns sounds to each semantic feature, non-semantic depth grid point (feature), and navigational feature. These sounds are spatialized in accordance with their coordinates in the user's head space. The sounds may be selectively modified by processor 508. Modifications can include any of adding/removing salience, loop-rate, time delays, etc for example. The sounds may be modified in accordance with defined parameters. Sound modulation occurs to generate the audio output from transmission through earphones 519.

Figure 4:
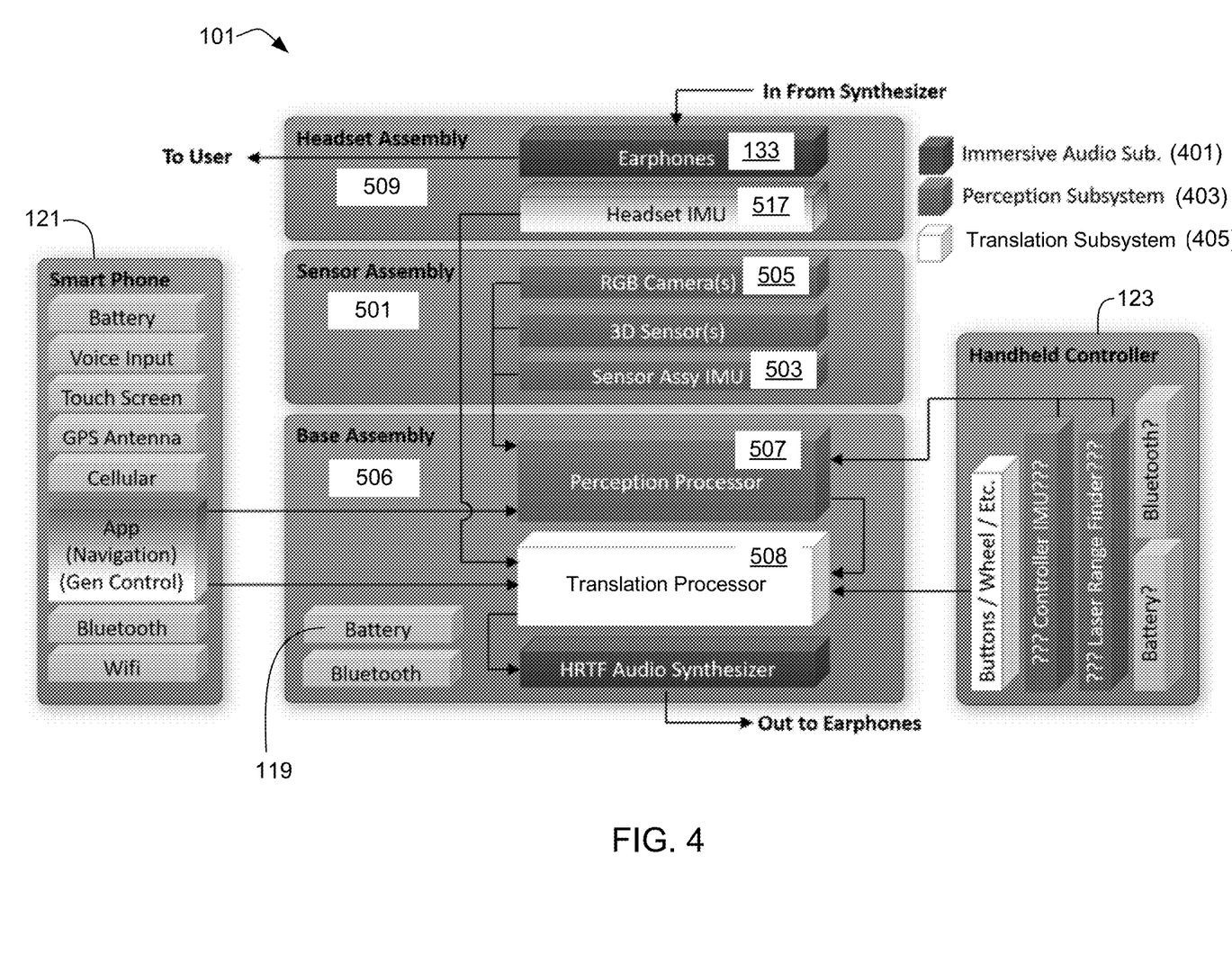
FIG. 4 is an architecture diagram of an exemplary embodiment of the schematic of FIG. 3.

Referring now also to FIG. 4 in the drawings, an architecture diagram of an exemplary embodiment of system 101 is illustrated. It is understood that system 101 may be illustrated in different forms and yet still accomplish the generation of an AAR environment for the user to immerse within. System 101 in FIG. 4 is one such simplified example. System 101 is broken out showing the system architecture in more detail.

System 101 has a headset assembly 509, a sensor assembly 501, and a main base assembly 506. System 101 is illustrated in this manner in an effort to assist in conveying differences in this system from those of legacy systems that use voice commands and voice identification as their primary efforts of navigation.

System 101 includes three major subsystems to assist in the generation of an accurate AAR environment, namely an immersive audio subsystem 401, a perception subsystem 403, and a translation subsystem 405. In FIG. 3, these three subsystems are shown within the system architecture diagram and are dispersed therebetween each of the different components. For example, immersive audio subsystem 401 occurs partially in headset assembly 509 and base assembly 506. Furthermore, perception subsystem 403 occurs within sensor assembly 501, base assembly 506, portable electronic device 121, and manual user interface 123. The translation subsystem 405 can be represented through base assembly 506, portable electronic device 121, and manual user interface 123. These three subsystems are used to produce the AAR environment for the user. The shading of each subsystem helps to identify how that subsystem is integrated into the different assemblies.

As noted previously, system 101 is configured to independently monitor and identify environmental features around the user through assembly 501 while also tracking and monitoring the orientation of the user's line of sight. As the user may move the head frequently, assembly 501 is best suited potentially to be secured in a stable location near the user. The could be on the user or around the user. When worn by a visually impaired user, system 101 may include a main body assembly 506 (i.e. base assembly) and a headset assembly 509.

Assembly 506 may be worn around the waist or in communication with the torso of the user. It is preferred that assembly 506 be securely connected to the user to aid the cameras in operation. If assembly 506 is coupled to only a piece of clothing, it is highly likely to move and shift during movements of limbs of the user or in the wind. The position of main body assembly 506 should be stabilized relative to the user so as to maintain a consistent orientation with respect to the user's body orientation. Additionally, it is desired that it is not obstructed in view by clothing or other items.

The main body assembly 506 is secured to the user in a manner allowing it to view forward or in front of a user as this is the direction of travel. It is understood that the ability to view rearward or to the sides of the user is contemplated and may be included in system 101. Headset assembly 509 is configured to track and monitor the actual line of sight of the viewer as determined by the direction the face is oriented. As noted above, the line of sight (LOS) of the main body assembly 506 may be different from that of the line of sight of the headset assembly 509 as the user will likely turn their head. Assembly 501 and 509 have a different coordinate system. It is understood that one or more modules, sensors and processors may be included within each assembly 506 and 509 to process, monitor, and track movements and/or the line of sight of the body of the user separate from that of the head of the user.

Headset assembly 509 may include a microphone. Assembly 509 includes IMU 517 and earphones 133. Headset IMU 517 is secured in a manner to move with and/or track the movement of the head of the user. Assembly 509 is capable of being coupled in some way to the user's head and may be integrated with the headphones or coupled to the user's head using a pair of eyeglasses, hair clip, hat/cap, etc. IMU 517 is configured to track the movement and orientation of the head of the user via one or more line of sight sensors. Although many different styles and methods may be used to allow the parts of IMU 517 to function as recited herein, it is thought that IMU 517 may include any number of accelerometers, compasses, and inclinometers, and may be supplemented by some means of visual odometery.

Main body assembly 506 is configured to include one or more processors, detect features of the environment through assembly 501, provide or process received navigational data from navigation module 509, and process raw data from IMUs 517 and 503 to determine relative positions of assemblies 509 and 501. Although assembly 506 is described as being inclusive of each of the aforementioned elements, it is understood that the various elements and components in both assemblies 506 and 509 may be separated or decoupled from one another into different assemblies. Additionally, the various elements and components in assemblies 506 and 509 and their associated features and functions may also be combined in some manner. The drawings are meant to illustrate at least one embodiment of how such may interact.

Assembly 501 may include sensors of many types and styles. For example, IMU 503, as a subset of assembly 501, may include accelerometers, compasses, and inclinometers and may be supplemented by some means of visual odometery. In this embodiment of system 101, the camera 505 and IMU 503 are physically coupled together and are likely to be worn about a user's torso.

Navigation module 509 may be in the main body assembly 506 and is configured to locate the user and report navigation information to the processors. Module 509 includes all necessary hardware and software to provide common GPS Navigation capability. As shown as 509 in FIG. 3, it may be part of the system 101, or, as shown in FIG. 4, it may be within an external device (such as a smart phone 121) capable of communication with the system 101. As seen, much of the function of module 509 in FIG. 3 is found through external device 121 in FIG. 4.

Navigation module 509 is configured to regulate and facilitate the functions of navigation technologies 105 and can include everything necessary to report navigation information, such as GPS, navigation software applications, be online capable through cellular networks and WiFi, include optional voice command systems, waypoint calculator, warning calculator, and landmark calculator for example. Module 509 can receive navigation information from the user. This can include a destination to be navigated to, points of interest or landmarks, a selection of maps (indoor/outdoor) to use for navigation purposes and so forth. The navigation information is transmitted to processor 507.

Other optional functions of module 509 is the ability to automatically memorize routes taken by the user so as to provide the user the ability to retrace the route temporarily without having to reset a location destination. Additionally, module 509 can store details associated with commonly taken routes of the user. For example, points of interest to the user may be stored for recall at later times, like a restaurant. As noted previously, module 509 may be detached from assembly 506. Navigational data may be provided through a third party device such as a personal electronic cellular device.

System 101 may be configured to store and identify the location of repeatedly encountered obstacles. For example, if a user takes the same route to work and there is a pot hole in the road that the user has to navigate around, module 509 can store identity and location of that pot hole as an obstacle in the route during future travels. The location may be stored via module 509 whether included within or separate from assembly 506.

A portable electronic device 121 is optionally included and is in communication with at least one of the main body assembly 506 and the headset assembly 509. Device 121 includes an input/output interface for receiving inputs from the user. An example of device 121 would be a portable cellular phone with a touch screen. Application software can be downloaded onto device 121 for operation of and regulation of one or more system performance characteristics. An example of a system performance characteristic could include the sound level, navigation settings, location settings, and general system parameters. Software through device 121 may be used to supplement or replace portions of module 509, especially with respect to map location data, points of interest, and general navigation.

System 101 may further include a manual user interface 123 in communication with any of the assemblies, systems and modules. The manual user interface 123 serves as a link between the user and the processors such that activation of the manual user interface allows the user to adjust system performance characteristics. Interface 123 may include a roller ball, button, or switch, for example, that when manually activated, a function within system 101 is performed. It is understood that multiple devices may be useful for a user interface (i.e. handheld remote, integrated smart phone, microphone, laptop, etc.). Device 121 may serve as a user interface allowing the user to regulate performance of one or more features of system 101.

A conceivable, although not limiting, use of device 121 and interface 123 is that ability of the user to instantaneously capture, assign, or classify objects or information within the 3D audio environment. For example, a user points his LOS toward an object or area of interest and performs a manual action (such as clicking a button). Potential uses may include wherein the system 101 provides more detail (i.e. linguistically) about the denoted object/area clicked on. Additionally, the system 101 may optionally change how selected object is presented (i.e. mutes the object or promotes the object with an enhanced sound effect). Likewise, the system 101 may mark the selected location as a "landmark" or location of particular interest on the digital map (i.e. mark the location of a pothole on the digital map). With a click/single action of interface 123 the user can send input data to the processors to assign or adjust a classification of an object in the line of sight of the user.

Interface 123 can be configured to permit various selectable functions through a plurality of sequential activations. For example, a single activation performs a first task. A double activation (push button twice) may perform a secondary task and so forth. It is understood that system 101 may use either or both of interface 123 and device 121. Additionally, the functions and features of interface 123 may be combined into the functions and features of device 121.

Another optional feature of system 101 is the ability to permit gaze focusing. The function of gaze focusing allows the user to adjust the peripheral vision of the user's audible environment. For example, the user may be focused on a particular area and is uninterested in peripheral events. Therefore, the user can decrease the salience of sounds applied to peripheral features. This can be done by decreasing the volume (although volume fluctuation may be mistaken for a distance change) of peripheral markers to minimize distraction. Conversely, the user may add distortion to the sounds or mix white noise with the sounds.

Another optional feature is that of radius adjustment, which allows the user to adjust the distance of vision of system 101. This permits the user to either mute or minimize the emphasis (i.e. decreased salience) of objects beyond the selected radius. The radius may be increased, if for example the user was in a park or wide open space. Alternatively the radius may be decreased if the user was in a confined space.

The function of focus settings are similar to those of radius adjustment and gaze focus. Focus settings are settings particular to a type of environment and situation. These can be automatically applied when detected or can be manually adjusted. For example, the system may adjust these settings automatically based upon the density of the environment (i.e. the number of reportable features that exist within the scene), or the movement of the user (i.e. rapid movement on a straight path vs. slow movement on a meandering path).

Figure 5:
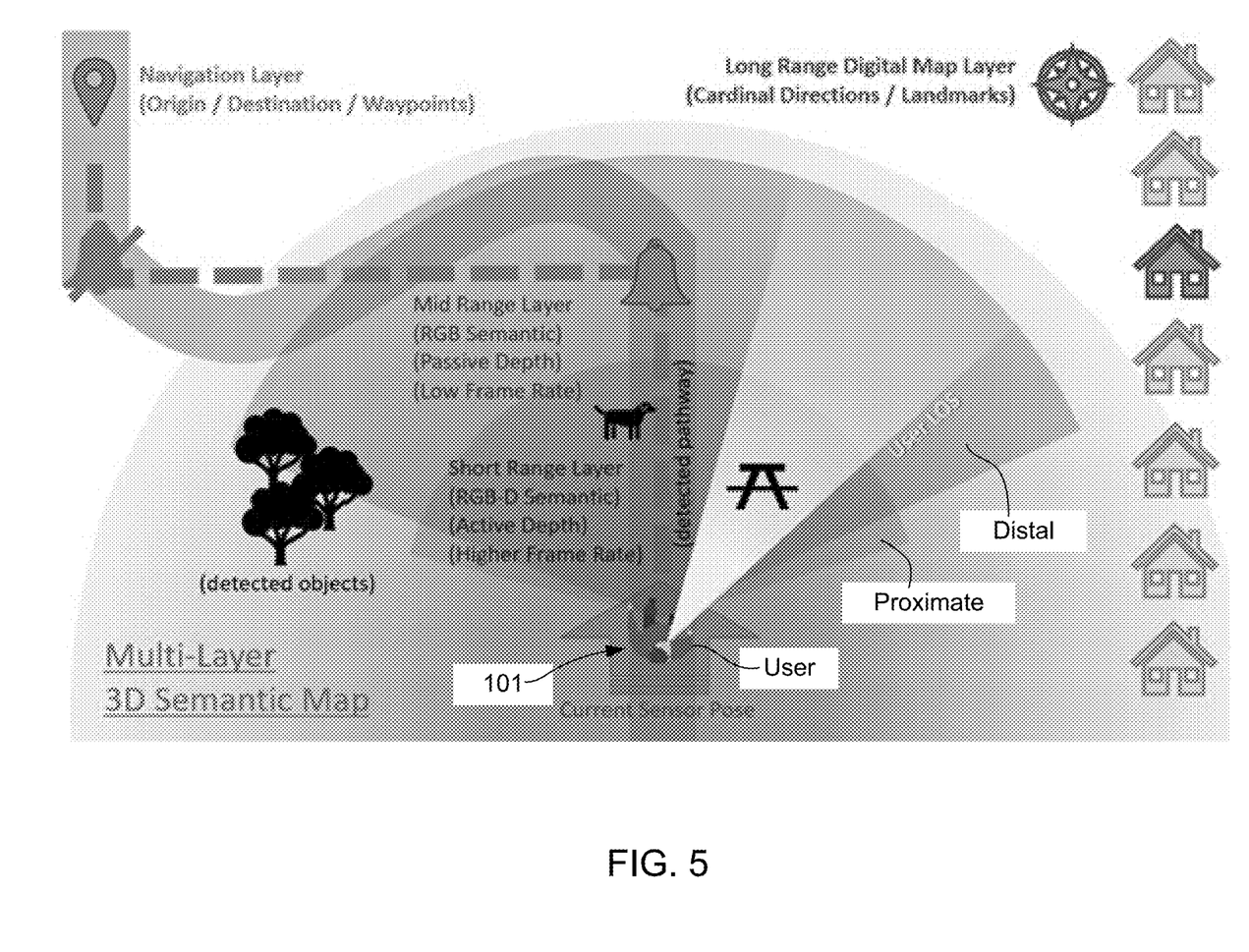
FIG. 5 is a high-level system function chart for the route guidance and proximity awareness system of FIG. 3.

Referring now also to FIG. 5 in the drawings, a high-level system function chart of system 101 is illustrated. A top view of a user is depicted. Base assembly 506 is coupled to the main torso of the user.

A camera within base assembly 506 captures video or images of the environment in front of the user. The camera is depicted as a camera 505. The area in front of the user is separated into the area proximate to the user, thereby a short range layer; and a mid range layer for an area more distal to the user. The proximate area can be given any distance away from the user, such as 15 or 25 feet for example. The mid range layer may reach beyond the proximate area and extend to a total of 50 or 75 feet in front of the user for example. Ultimately, the distal area extends beyond the proximate area. System 101 is configured to handle the features and objects within the different areas in different ways so as to assist the user in isolating which features in the environment are of more importance to be conscious of. Other features relating to navigation and mapped features (i.e. homes) are also seen.

Shown in FIG. 5 are examples of semantic and non-semantic objects. Proximal detected features may include semantic features which are recognizable through object detection software as objects, such as people, animals, cars, etc in the user's most immediate real-time surroundings (proximate area). Distant or distal detected features may include semantic features that are recognizable but that are just out of range of any 3D sensor but are still within range of the camera. The camera may detect a person located 30 feet away but be too far away to be proximate. Features may be used to provide an intuitive sense of orientation by serving as temporary landmarks or which may help to establish an understanding of the scale of the environment. An example is a distant tree.

Additionally, non-semantic features, or those features which are non-recognizable due to it having such varied shapes, are also included within proximal areas and distal areas. These features may be rocks, trees, walls, and other "mass objects" in the user's proximate and distal areas. As these are not identifiable through object detection software, classification of the object is difficult. System 101 handles these features as noted previously with respect to FIG. 3.

Features detected through the cameras, whether proximal or distal, are located via a camera coordinate space as noted with FIG. 3. Objects located through Module 509 are typically located via GPS coordinates via a global coordinate system (GCS). GPS coordinates are based on a specific latitude and longitude on the globe. Processor 507 converts the individual coordinate spaces to the common coordinate space, which is expressed as an angle off of Magnetic North, an angle off of the direction of gravity (degree of rise), and a distance from the camera. In the case of distal detected features, the distance measurement will be considered "out of range", "on the horizon", or "infinite" as it is in the distal area.

Mapped features can be public landmarks streets, intersections, private landmarks, and cardinal direction markers. These are expressed on the global coordinate system with longitude and latitude. Navigational features relate to waypoints or origin and destination pins along a route. These are expressed also on the global coordinate system having longitude and latitude. In FIG. 5 a bell symbol is shown along a planned route of travel with a pin at the final destination. Waypoints may be made audible within the AAR environment to allow the user to follow or travel towards it. This prevents the need for audible turn-by-turn instructions.

As system 101 is generating a wholistic environment for the user via audible sounds, it is desired that such a system employs techniques to give persistence to detected features. One example of such persistence is to calculate that, when an object which is detected at one moment (one frame), and a similar object with a similar location is detected in the next moment (the next frame), the two objects are likely to be the same object.

Additionally, persistence can be applied to objects during brief periods of lost detection. Such periods of loss of detection may include moments of occlusion of the object, moments of departure from the camera's field of view, moments of misclassification of the object by the object recognition software, or moments of loss of data altogether. For example, if the system detects a feature and then the user turns or moves that brings that feature now out of view, system 101 will continue to briefly approximate the existence and location of the feature relative to the user despite it being out of the field of view of the camera. This persistence may last for a set duration of time. Furthermore, if that feature comes back within view (i.e. the user moves or turns back), system 101 is configured to is configured to deduce that it is the same feature. The position of the feature may be approximated based upon an expected location outside the line of sight of the user. Additionally, it may be approximated outside the field of view of the camera as determined upon the movement of the feature prior to leaving the frame of view of the camera. It is understood that any tracking of any feature that has passed outside the view of the camera is based on a level of uncertainty of the actual location of the feature.

The conversion to the common coordinate space is not required prior to passing to translation subsystem 405, but it is preferred as it helps with the persistence of feature identification in the field of view. Features in the environment often change locations. The speed at which they move can be a factor of the feature's true speed (speed of zero in the case of a stationary object) and that of the movement of the user when using the camera coordinate space. If feature locations were based solely off of the camera coordinate space, then movement of the user would drastically affect the ability of system 101 to track objects. For example, when going frame by frame, a moving object covers a selected distance. When the user moves, this distance can be amplified. In such cases, system 101 may not be able to know if the feature in the new frame is in fact the same feature as in the prior frame given the sudden positional changes. By locating its position to the common coordinate space, sudden movements of the user are of less importance. The tracking of features is greatly simplified.

The fully generated layered 3D Semantic Map is communicated to the translation subsystem 405. Subsystem 405 includes translation algorithms for processing the data received, a head tracking system or IMU (inertial measurement unit) worn in conjunction with the user's head (i.e. IMU 517). The purpose of the Translation Subsystem 405 is to translate the Layered 3D Semantic Map in preparation of its presentation to the user in the form of an immersive audio spatial environment.

As seen in FIG. 5, the user has a line-of-sight (LOS) which may or may not be aligned with that of the base assembly 506. The AAR environment is based on the viewing area or line of sight of the user. Therefore, objects and features within the AAR environment are to be aligned with the user's coordinate head space.

Whereas existing systems put all cameras on a head mounted device, such cameras were heavy. This kept a singular coordinate system for objects detected but brought about extreme latency issues as the head was usually moving a lot compared to the body of the user. Processing the data was difficult. Additionally, this data was not synchronized with the GPS coordinates to give an immersive environment. The navigation was treated separate from the object detection. Locating processors and cameras off Headset assembly 509 decreases weight on the head of the user and minimizes latency issues.

System 101 is configured to prioritize objects and features detected in proximate and distal areas about the user. Therefore, objects and features within the line of sight of the user (proximate and distal) may be given more priority compared to objects and features outside the line of sight of the user. Features captured through the perception subsystem 403 are passed to translation subsystem 405 for the assigning of a sound based on a singular coordinate system based on a user's line of sight. Translation subsystem 405 and/or perception subsystem 403 converts the common coordinate space to the coordinate head space which is based on the line of sight of the user.

Two key points to consider for prioritization of features are: 1) which features should be presented to the user; and 2) how should each of the features be represented in audible form. There are different ways to prioritize or analyze the features detected. System 101 may use consolidation or separation of features based on juxtaposition of individual features with respect to one another. Alternatively, the user may set user preferences at any time to adjust prioritization. System 101 may take environmental considerations such as scale, density, and complexity of environment into consideration as well. Another way is to use the user's task as a means of prioritizing the features. This could relate to the precise navigation or waypoint destination. Naturally, immanent safety concerns for the user may also be considered, such as a warning of collision course, crosswalk signaling, etc.

Each of the features are assigned an audible identifier. The identifier may be assigned to classifications of features or to individual features. For example, all cars may be presented with a particular audible identifier. All landmarks may have a different identifier. The user may select the type of audible identifier for each feature or the system may have pre-set audible identifiers ready for use. System 101 may elect to modify the audible identifier for the features depending on the importance of each feature. Modifications may be done through distortion, salience, appended alarms sounds, or volume variations for example. Once assigned, the audible identifier along with the location data is passed to the immersive audio subsystem 401.

Referring now back to FIG. 4 in the drawings, subsystem 401 includes Head Related Transfer Function (HRTF) software and processing along with earphones. A prime purpose of subsystem 401 is to use HRTF modulation to spatialize the audio files provided by the Translation Subsystem 405, and to present them to the user through earphones.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A route guidance and proximity awareness system for a visually impaired user, comprising:
   a sensor assembly including a camera configured to detect a feature in an environment proximal to the visually impaired user and capture feature data of that feature;
   a navigation module configured to measure localized coordinate data of the user and provide navigation data;
   a headset assembly having a headset IMU having an inertial measurement unit configured to capture head data including the movements and line of sight of the user's head, the headset IMU being separate from the sensor assembly, the sensor assembly being mounted in a relative orientation with respect to the visually impaired user, the headset assembly providing head data associated with the changing line of sight of the user's head;
   a perception processor configured to receive the feature data from the sensor assembly and the coordinate data of the user from the navigation module to generate an assigned position of the feature within a first coordinate space relative to the location of the user, the perception processor further configured to convert the position of the feature within the first coordinate space from the sensor assembly to generate a second coordinate space for the feature in relation to the line of sight of the user's head based upon head data from the headset IMU;
   a translation processor for receiving data from the perception processor and configured to process that data to assign a sound to the feature and spacialize that sound based upon the coordinates of the feature in relation to the user's line of sight in the second coordinate space, the sound also differing based upon an identification of the type of feature, the translation processor classifying the feature and assigning the type of sound; and
   an earphone for broadcasting an immersive audio-augmented reality environment wherein each sound is conveyed through the earphone with depth and location.

2. The system of claim 1, wherein the camera of the sensor assembly includes an inertial measurement unit to capture the feature data, the feature data including raw movement and orientation data of the feature in relation to the user, the data being transmitted to the perception processor.

3. The system of claim 2, wherein the sensor assembly includes a second camera that is configured to capture video of the feature in the environment and depth data as measured from the user, the depth data and video being transmitted to the perception processor.

4. The system of claim 1, wherein the camera of the sensor assembly is configured to capture video of the feature in the environment and depth data as measured from the user, the depth data and video being transmitted to the perception processor.

5. The system of claim 1, wherein the camera is an RGB-D camera.

6. The system of claim 1, wherein the navigation module provides the GPS coordinate of the user.

7. The system of claim 1, wherein the navigation data of the navigation module is a navigation solution through one or more waypoints located within the audio-augmented reality environment.

8. The system of claim 1, wherein the sensor assembly is mounted to the user.

9. The system of claim 1, wherein common coordinate space includes the converted coordinates of the feature and the user to that of a head space coordinates based on the line of sight of the user.

10. The system of claim 1, wherein the perception processor tracks movement of the feature.

11. The system of claim 1, wherein the perception processor classifies the feature, assigns as status to the feature, and monitors the feature's location.

12. The system of claim 1, wherein the perception processor identifies the feature as at least one of a semantic object and a non-semantic object.

13. The system of claim 1, wherein the translation processor receives feature data and navigation data from the perception processor.

14. A method of providing an audio-augmented reality environment to a user, comprising:
locating a sensor assembly to a user, the sensor assembly including a camera to detect a feature in the environment around the user, the sensor assembly transmitting feature data to a processor;
capturing navigation data related to a user through a navigation module;
processing the feature data and the navigation data to classify the feature and locate the feature in relation to the user location within a first coordinate space;
monitoring the line of sight of the user, the line of sight being assigned head space coordinates within a second coordinate space;
processing in real time the feature data and navigation data further by assigning sounds to each feature and point in the navigation data, the sound differing based upon an identification of the type of feature, classifying the feature and assigning the type of sound in accordance with the feature's classification;
converting the coordinates of the feature and the point in the navigation data from the first coordinate space to the head space coordinates;
spatializing the sounds in relation to the head space coordinates; and
broadcasting the sound data to the user, the sound including a distance and location in relation to the line of sight of the user.

15. The method of claim 14, wherein the navigation data includes at least one of the GPS location of the user and a navigation solution.

16. The method of claim 14, further comprising:
converting the coordinates of the feature data and the navigation data to a common coordinate space.

17. The method of claim 14, wherein the navigation data includes waypoint navigation solutions wherein navigation data is provided to the user in the audio-augmented reality environment as a sound having a location and distance.

18. The method of claim 14, further comprising:
modifying the sounds assigned to at least one of the feature and the navigation point.

19. The method of claim 14, further comprising:
tracking movement of the feature.

20. A route guidance and proximity awareness system for a visually impaired user, comprising:
a base assembly attachable to a body of the user, the base assembly including a camera to detect a feature in an environment;
a headset assembly coupled to a head of the user, the headset assembly configured to track line of sight; and
a sensor suite in communication with the base assembly and the headset assembly, the sensor suite including:
a perception subsystem configured to detect the feature and track its location within a first coordinate space based upon the base assembly, the perception module including navigational software and map data, the perception subsystem configured to transmit a feature identifier and a location of each feature detected;
a translation subsystem configured to receive the feature identifier and the location of each feature in real time and assign a sound identifier to each detected feature, the sound differing based upon an identification of the type of feature, the translation subsystem classifying the feature and assigning the type of sound, the translation subsystem configured to process the location data of each identifier to a singular coordinate system based upon the user's line of sight, the processing of the location data includes switching the location data from the feature in the first coordinate space to a second coordinate space dependent upon the line of sight of the user; and
an immersive audio subsystem configured to process spatialize the location data of each detected feature and create an augmented audio reality environment for the user.

* * * * *